No. 618,593. Patented Jan. 31, 1899.
E. L. WILLIAMS.
ACETYLENE GAS GENERATOR.
(Application filed Sept. 13, 1897.)
(No Model.) 2 Sheets—Sheet 1.

Witnesses,
Inventor,
Edward L. Williams
By Offield, Towle & Linthicum
Attys.

No. 618,593. Patented Jan. 31, 1899.
E. L. WILLIAMS.
ACETYLENE GAS GENERATOR.
(Application filed Sept. 13, 1897.)
(No Model.) 2 Sheets—Sheet 2.
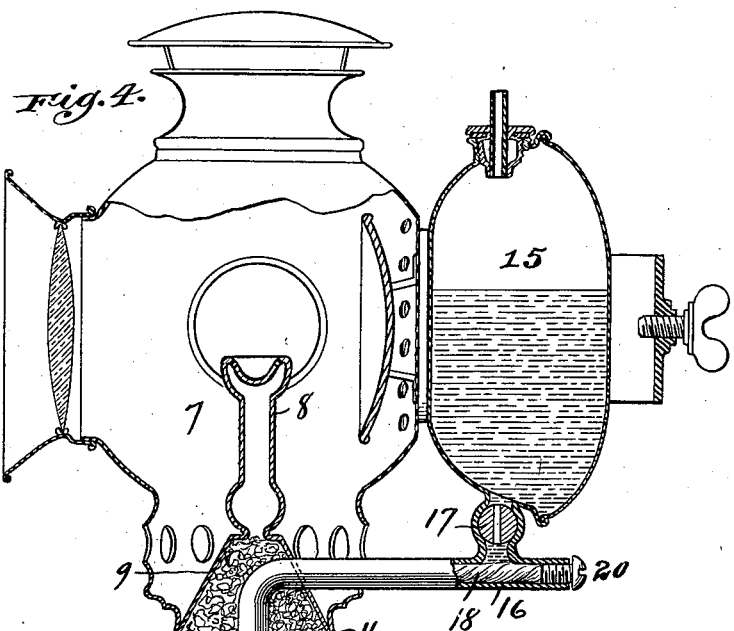
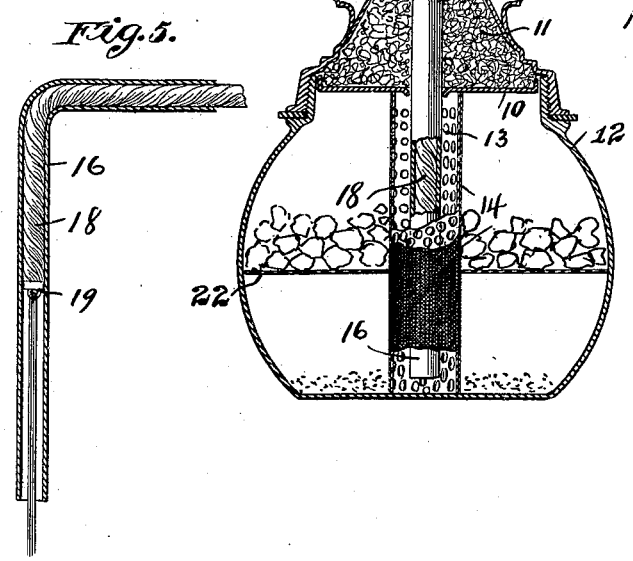
Witnesses,
F. B. Mann,
Frederick F. Goodwin
Inventor:
Edward L. Williams
by Offield, Towle & Linthicum
Attys.
THE NORRIS PETERS CO., PHOTO-LITHO., WASHINGTON, D. C.

UNITED STATES PATENT OFFICE.

EDWARD L. WILLIAMS, OF CHICAGO, ILLINOIS.

ACETYLENE-GAS GENERATOR.

SPECIFICATION forming part of Letters Patent No. 618,593, dated January 31, 1899.

Application filed September 13, 1897. Serial No. 651,499. (No model.)

*To all whom it may concern:*

Be it known that I, EDWARD L. WILLIAMS, of Chicago, Illinois, have invented a certain new and useful Improvement in Portable Gas-Generators, of which the following is a specification.

My invention relates to improvements in that class of gas-generators which are constructed so as to be portable and which may be conveniently embodied in a portable lamp for house use or to be carried upon vehicles.

The chief feature of my invention relates to a means for supplying a fluid, such as water, to a solid, such as calcium carbid, thereby generating gas which can be conducted to a burner, if the invention is embodied in a lamp, or which may be piped to a reservoir or holder, if the invention is otherwise embodied.

Figure 2:
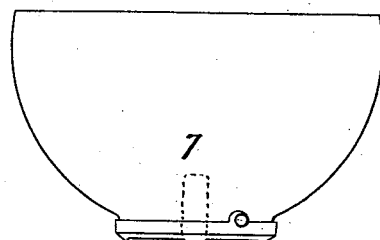
Figure 1:
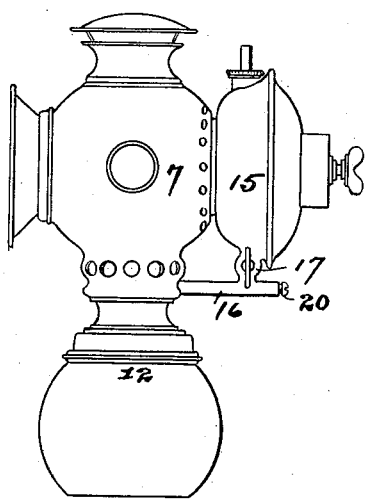
Figure 3:
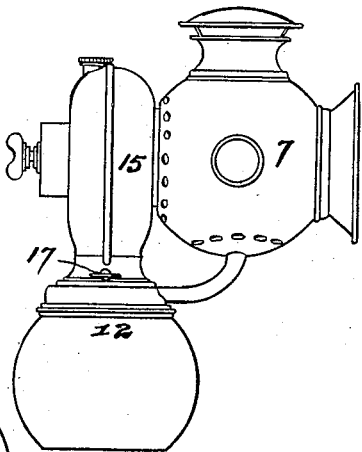

In the accompanying drawings, Figures 1, 2, and 3 are side elevations showing my invention embodied in portable lamps, each of the lamps shown consisting, essentially, of a water-reservoir, a generating-chamber, and a flame or burner chamber with their several accessories. Fig. 4 is an elevation, mainly in vertical section, through a lamp of the type shown in Fig. 1. Fig. 5 is a detail of the water-supply tube, showing a means for inserting and removing the wick.

In the drawings, 7 represents the flame-chamber, which will be provided with a suitable burner 8, which will be in communication with the gas-chamber. In the form of construction shown in Fig. 4 the burner 8 is mounted upon a conical body 9, forming within the main body of the lamp, in conjunction with the diaphragm 10, a gas-filtering chamber containing a filtering medium 11, such as cotton. This diaphragm is loosely mounted upon the wall of the generating-chamber 12 and rests also upon the top of the perforated tube 13, mounted within said chamber. The perforated tube is covered with a fabric, such as cheese-cloth, (indicated at 14.) The water-reservoir is marked 15 and communicates through the supply-pipe 16 with the interior of the perforated tube 13, passing through a central aperture in the diaphragm 10. A straightway valve 17 controls the flow of water from the reservoir 15. Within the supply-tube 16 is placed a suitable porous material, through which the water may percolate. This porous material may be ordinary wicking, such as indicated at 18, Fig. 4, or other material capable of restraining the free flow of the water while permitting it to percolate or force its way therethrough, so as to be delivered in drops at the open end of the tube. I have found the wicking serviceable, and in order to conveniently insert and remove it such wicking may be provided with an eyelet or piece of metal as, 19, Fig. 6, to which a cord or wire may be connected for drawing the wicking into the tube 16. The outer end of the tube may be closed with a screw-plug 20.

In the form of construction shown in Fig. 1 the burner-chamber is mounted in line with or in the vertical axis of the generating-chamber. In the house-lamp shown in Fig. 2 the burner-chamber, water-reservoir, and generating-chamber are all mounted in vertical alinement, and in Fig. 3 a lamp is shown wherein the water-reservoir is superposed upon the generating-chamber, while the flame-chamber is located at one side of the axis of the lamp. The action of the generator in each of these cases is the same. It will be noticed that in all cases the reservoir is elevated above the generating-chamber and that the water is fed by gravity, its pressure being sufficient to cause it to penetrate through the wicking or other retarding material inclosed within the water-supply tube. The water will thus be discharged in drops at the end of the tube and, striking the bottom of the generating-chamber within the perforated tube 13, will pass through the perforations thereof and be absorbed by the fabric covering surrounding said perforated tube and thereby conducted to its very top. The carbid, being in contact with this wet fabric, will take up sufficient moisture therefrom to generate the gas. In a portable generator, such as the lamps shown, the movement will be sufficient to constantly bring the unconsumed carbid into contact with the wet envelop and the mass will be sufficiently penetrated by the water to generate the gas in quantities sufficient for the needs of the lamp. It may be observed, further, that the gas, having free access to the lower end of the water-supply tube, will when an excess pressure is produced operate to retard the flow of the water, and thereby the generator becomes not only automatic in the supply of the water for the generation of the gas, but also said supply is automatically regulated or controlled, being decreased as the volume of gas increases and increased as the volume of gas is reduced by consumption, and thus the generator is automatic and self-controlled or self-regulated.

I have shown my invention as embodied in a lamp—that is to say, a generator having a gas-burner connected therewith; but my invention in its broader scope may be embodied in a generator alone and the structural features may be of modified form and arrangement.

I have found that in order to successfully generate gas in uniform quantities for consumption it is necessary to utilize the gas-pressure to control the flow of the water, and this I accomplish by connecting the generating-chamber and the liquid-chamber by a tube or passage having an imperforate portion which is filled or packed with a porous or fibrous material of such extent and density as to fractionate or minutely subdivide the water and thus restrict its flow and cause it to be delivered drop by drop. This fractionating-tube being also exposed to the gas-pressure, the liquid particles are opposed in their downward movement by the gas-pressure exerted in the interstices or pores of the packing, and thus the supply of liquid is controlled by and is proportional to the gas-pressure generated, the water flowing freely until the generation of gas begins, and then the gas-pressure restrains the flow of the liquid to the amount necessary to produce a constant supply of gas. Should an excess of gas be generated—as, for example, when the water is caused to flow more rapidly by reason of a shock or jar—the gas-pressure will be so much increased as, acting in opposition to the liquid within the fractionating-passage, it will check or even entirely stop the flow of the liquid until the normal gas-pressure is restored.

Obviously in my invention the valve shown is simply used to cut off the flow of water when it is not desired to generate gas, and such valve need not be made with particular accuracy, as reliance is not placed thereon for any absolutely water-tight or gas-tight joint and no nicety of adjustment of the valve need be made when the water-supply is turned on, the only consideration being to open a free passage from the head or supply of water to the porous material, which serves as a feeding and regulating medium.

It may be objected that the spent carbid will adhere to the surface of the perforated tube or the fabric surrounding it, and thereby prevent the dry carbid coming in contact with this wet envelop. Such action, if it exists to any extent, has not been found to prevent the operation of the lamp; but to obviate the disadvantages arising from this cause I have shown in Fig. 4 a diaphragm or a horizontal partition dividing the generating-chamber or carbid-receptacle into upper and lower chambers. This diaphragm (marked 22) is perforated and serves as a sieve, the motion of the lamp serving to discharge the spent carbid through the meshes or perforations of this sieve into the chamber below. The diaphragm 10 is sufficiently loosely fitted to permit the gas to escape into the filtering-chamber, while preventing the carbid from being thrown up and obstructing the burner-orifice.

I claim—

1. A gas-generator comprising in combination a generating-chamber, a liquid-chamber above the generating-chamber, and a tube connecting said chambers and having a portion packed with a fibrous or porous material and constituting an extended fractionating-passage with imperforate walls, wherein the liquid is minutely subdivided and exposed in such condition to the gas-pressure, whereby the supply of liquid is controlled proportionally to the gas-pressure.

2. In an acetylene-gas lamp the combination with a generating-chamber to contain calcium carbid and having a gas-outlet provided with a burner, a water-chamber elevated above the generating-chamber, a fractionating-passage for water and gas connecting said chambers and comprising a tube having an imperforate portion packed with fibrous or porous material, said imperforate portion being of a length and said material being of sufficient density to control the feed of water to said generating-chamber by the pressure of the developed gas, substantially as described.

3. In a gas-generator of the character described, a liquid-supply pipe having an exposed terminal and a closure therefor, and a wick filling said supply-pipe, one end of said wick being provided with an eyelet or equivalent metallic fastening, whereby said wick may be drawn into and removed from the tube, substantially as described.

EDWARD L. WILLIAMS.

Witnesses:
FREDERICK C. GOODWIN,
IRVINE MILLER.